United States Patent [19]
Mayer

[11] Patent Number: 5,444,805
[45] Date of Patent: Aug. 22, 1995

[54] INTEGRATED OPTICAL COMPONENT

[75] Inventor: Klaus-Michael Mayer, Gerlingen, Germany

[73] Assignee: Robert Bosch GmbH, Stuttgart, Germany

[21] Appl. No.: 302,708

[22] Filed: Sep. 2, 1994

[30] Foreign Application Priority Data

Mar. 7, 1992 [DE] Germany .......... 42 07 311.1
Mar. 13, 1992 [DE] Germany .......... 42 08 278.1

[51] Int. Cl.$^6$ .............................................. G02B 6/20
[52] U.S. Cl. .................................. 385/49; 385/14
[58] Field of Search ............ 385/14, 49, 39, 129, 385/130

[56] References Cited

U.S. PATENT DOCUMENTS

| | | | |
|---|---|---|---|
| 4,666,236 | 5/1987 | Mikami et al. | 350/96.15 |
| 4,765,702 | 8/1988 | Dohan et al. | 385/49 |
| 4,966,433 | 10/1990 | Blonder | 385/49 |
| 5,280,550 | 1/1994 | Parriaux et al. | 385/14 |
| 5,357,593 | 10/1994 | Bossler | 385/49 |

FOREIGN PATENT DOCUMENTS

| | | | |
|---|---|---|---|
| 3012612 | 1/1991 | Japan . | |
| 3288102 | 3/1992 | Japan . | |
| 4-180004 | 6/1992 | Japan | 385/49 |
| 2000877 | 6/1977 | United Kingdom . | |

OTHER PUBLICATIONS

J. T. Boyd et al: "Optical coupling from fibers to channel waveguides formed on silicon", In: Applied Optics, vol. 17, No. 6, Mar. 15, 1978, New York, pp. 895–898.

Primary Examiner—Rodney B. Bovernick
Assistant Examiner—John Ngo
Attorney, Agent, or Firm—Spencer, Frank & Schneider

[57] ABSTRACT

Proposed is an integrated optical component, particularly a modulator, directional coupler, switch, polarizer, distributor or the like, as well as a method of producing such a component. The component has a light waveguide (17) of an optical polymer which is disposed on a silicon substrate (10) that has at least one optical buffer layer (14) having a low refraction index, wherein a positioning trench (12) that is anisotropically etched into the substrate (10), is essentially aligned with the light waveguide (17) and has a V-shaped cross-section is provided for receiving a glass fiber (11) to be coupled to the coupling end surface (18) of the light waveguide by means of end-to-end coupling. The positioning trench (12) is filled with a plastic material (15) at the end region on the coupling side, wherein the light waveguide (17) extends on the plastic material (15) up to an end surface (18) of the plastic material (15) which extends perpendicular to the axial direction of the light waveguide (17) and lies in the plane of the coupling end surface. This end surface (18) is disposed outside of a diagonally-extending end region (13) of the positioning trench (12). The end surface (18) and thus the coupling end surface can therefore be created in a simple manner by means of laser machining processing, in which the established technology for producing the positioning trench by means of anisotropic etching can be used.

22 Claims, 3 Drawing Sheets

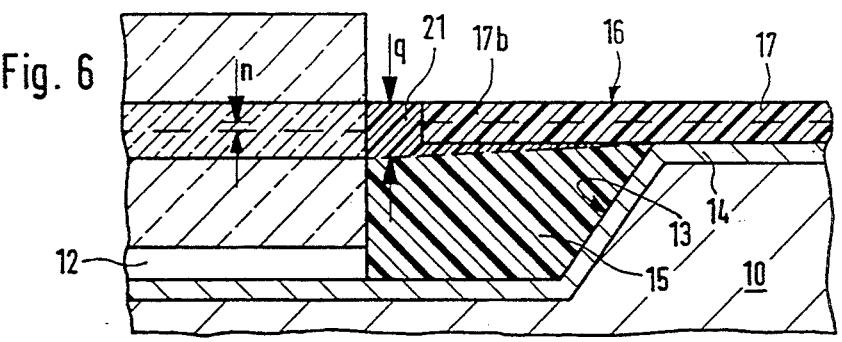
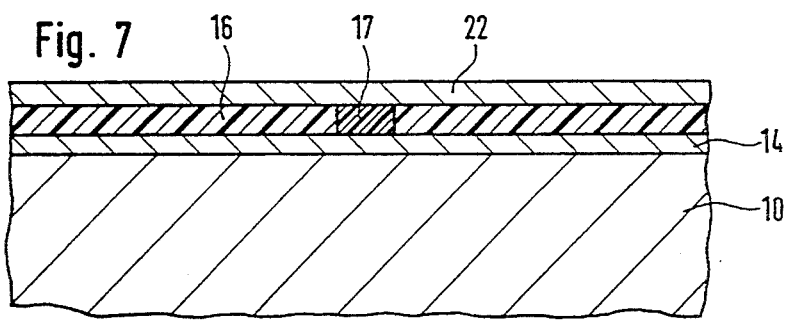
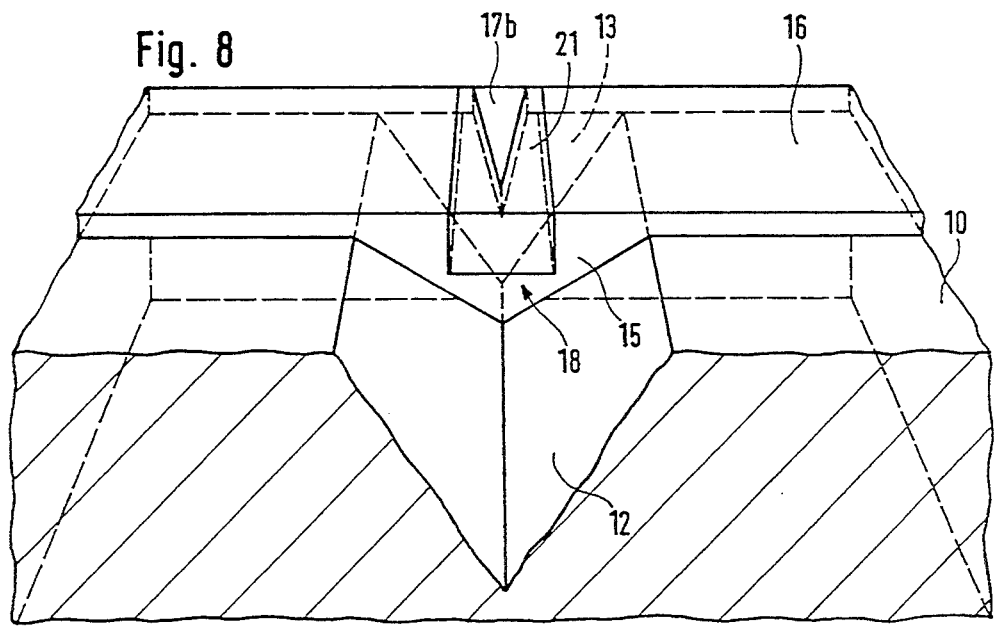

INTEGRATED OPTICAL COMPONENT

PRIOR ART

The invention relates to an integrated optical component, particularly a modulator, directional coupler, switch, polarizer, distributor or the like, according to the generic type of the main claim, as well as a method of producing such a component.

The increasing use of integrated-optical components for optical telecommunication, sensory analysis and the computer field (optical databus), is making optical connection techniques (chip-fiber coupling) increasingly significant. Smaller, private exchanges having approximately 1000 subscriber connections already require, for example, several thousand optical connections between the individual sub-switching stages, because the number and complexity of the optical components integrated on individual substrates is severely limited due to the extreme aspect conditions in optics. In such applications the reliability (mechanical and thermal stability) and realizability of optical connection technique, and the necessary connection expenditure ultimately determine the attainable degree of expansion of an optical exchange system.

The light-coupling efficiency in the coupling of glass fibers and integrated waveguides is extremely dependent on the spacing of the end surfaces, a lateral displacement and an angular tilt of the optical axes relative to one another. During coupling, the glass fiber accordingly has five degrees of freedom, which must be optimized independently of one another: an axial degree of freedom, two lateral degrees of freedom and two angular degrees of freedom. In the field distributions which are typical for glass fibers, e.g. a lateral misalignment of only a few μm already leads to coupling losses in the dB range. An effective coupling method requires a reduction in the degrees of freedom and an option of simultaneous positioning of all fibers of a bundle. It is known from Appl. Opt. 17 (1978), 895, "Optical coupling from fibres to channel waveguides formed on silicon" by J. T. Boyd and S. Sriram, to etch V-grooves into a silicon substrate as positioning trenches. The anisotropically-etched V-grooves are bordered on all sides by slowly-etching {111} planes that form an angle of 54.7° with the wafer surface. The integrated waveguides are aligned with these V-grooves, and the width of the grooves can be optimized such that the fiber core comes to rest in the same horizontal plane as the light waveguide due to the resulting groove shape. The end face of the V-groove located in the region of the coupling surface with the light waveguide is likewise inclined at an angle of 54.7°, so that the glass fiber cannot be pushed completely up to the waveguide. As a solution to this problem, it is proposed by Boyd and Sriram to provide the glass fiber with an end surface that is likewise inclined by 54.7°, and therefore push the fiber core until it is in end-to-end coupling with the integrated light waveguide. However, this method has the disadvantage that expensive machining of the fiber end surface is necessary, and the fiber can only be laid into the groove in a certain position. Moreover, during coupling the danger arises that the two end surfaces will slide toward one another, or at least the end region of the fiber will be pushed out of the groove. An additional problem that arises is the necessity of providing not only the fiber, but also the integrated waveguide, with a correspondingly-inclined end surface.

It is also known from the cited publication to fix glass fibers in etched V-grooves and, by means of subsequent filling of liquid polymer (polyurethane), to produce a connection to the organic light waveguide that is guided in the extended V-grooves and defined by them. However, because the size of the grooves at the coupling point is predetermined by the diameter of the glass fiber sheath, such waveguides are extremely high-mode, and are not to be used for monomode telecommunication systems. Moreover, a tapering of the channel waveguide is proposed, in which the width and thus also the depth of the V-groove are gradually reduced in order to realize the transition to conventional thin-film waveguides. However, because a transition from the fiber core of the glass fiber to the channel waveguide causes a large jump in the diameter of the waveguide structures in this case, a startup of oscillations of higher modes is unavoidable, and therefore a higher coupling efficiency is not to be expected in single-mode operation.

ADVANTAGES OF THE INVENTION

In contrast, the integrated optical component according to the invention and the method for its production according to the invention have the advantage that a self-adjusting coupling of glass fibers or fiber arrangements to light waveguides of an optical polymer can be realized in a simple manner. End surface machining of the light waveguides is simple, and can preferably be executed by means of laser ablation. The production of the holding grooves for the glass fibers can be effected in a simple manner by means of anisotropic etching, according to an established technology. In this instance a high precision of the relative position of the fiber end surface and waveguide end surface is achieved. A high coupling efficiency can be achieved through easily realized field adaptations by means of exposure methods. Moreover, a high thermal and mechanical stability can be achieved through the common casting of waveguide and fiber. The component according to the invention is suited in a particular way for monomode waveguide structures.

Advantageous refinements and improvements of the component disclosed in the main claim are possible with the measures disclosed in the dependent claims.

A particularly simple and mechanically stable production of the light waveguide can be effected in that a layer that covers the buffer layer that supports the light waveguide and the plastic material in the V-grooves up to the plane of the end surfaces is provided with a polymer that can be altered in its refraction index through exposure, and, by means of corresponding exposure of this layer, the light waveguide is configured as a part thereof. Because of this, the waveguide can be configured in a variable manner following the mechanical application of the polymer layer. The region of the layer that is configured as a light waveguide has a higher refraction index.

The plastic material for filling the positioning trench is advisably likewise an optical polymer which is in particular identical to the layer covering the buffer layer. An optimum field adaptation can be effected here in that the end of the light waveguide on the side of the glass fiber is expanded adiabatically to the diameter of the glass fiber core. In this instance not only is a lateral widening possible, but in addition or as an alternative thereto, a vertical widening is possible which extends into the optical polymer that fills the V-groove.

In an advantageous manner, in addition to the geometric adaptation, the region of the optical polymer surrounding the light waveguide can have an index course that reduces the difference in refraction indices between light waveguide and the surrounding region toward the glass fiber for field adaptation of the light waveguide toward the glass fiber.

A further, advantageous option of adaptation and coupling consists of the end of the light waveguide on the side of the glass fiber converging acutely and terminating in a further light waveguide that has a lower refraction index and extends up to the glass fiber core. In this instance as well, a high degree of coupling efficiency is possible if the light waveguide having small cross-section dimensions guides relatively strongly with respect to the glass fiber core. The further light waveguide can have a larger expansion in width and/or depth, and the dimensioning of the glass fiber core can be adapted to the coupling end surface.

In an advantageous embodiment of the method of the invention, the application of the layer and the filling of the positioning trench can be executed in one work cycle with the same optical polymer. Because of this, production can be effected in a simple and cost-effective manner.

The configuration of the light waveguide is advisably effected by way of an exposure mask placed onto the polymer layer; an increase in the refraction index in the light waveguide region is effected by means of photopolymerization. Moreover, in the case of non-linear optical polymers, for example, an exposure mask can be placed onto the polymer layer, and a reduction in the refraction index can be effected in regions that border on the light waveguide.

In order to execute an adiabatic widening of the light waveguide before the glass fiber core for optimizing the field adaptation between glass fiber and light waveguide, an exposure mask having a widening mask opening is advisably used for lateral widening up to the diameter of the glass fiber core. Alternatively or in addition to this, the exposure intensity and/or the exposure time toward the glass fiber is increased in the manner of a ramp for vertical widening up to the diameter of the glass fiber core. To be able to execute an additional optimization of the field adaptation, a second mask having variable transparency can be used for post-exposure, with a greater transparency on the side of the fiber, and a lesser transparency on the side of the light waveguide.

In a second taper concept, for production and coupling of an acutely-converging light waveguide, first a light waveguide converging acutely toward the glass fiber is formed in a first exposure step with a first exposure mask, and afterward, in a second exposure step, a second light waveguide, which has a lower refraction index and connects the first light waveguide with the coupling end surface, is formed, the second light waveguide being adapted in its diameter to the glass fiber core.

With the method of the invention, a number of contiguous light waveguides or connections can be produced simultaneously in an advantageous manner.

DRAWING

Embodiments of the invention are represented in the drawing and described in detail in the following description. Shown are in:

FIG. 1 a top view of an integrated optical component having a coupled glass fiber in a V-trench as the first embodiment, FIG. 2 a vertical sectional representation of the component illustrated in FIG. 1, FIG. 3 a top view of a similar arrangement of an optical component having a tapered structure as the second embodiment, FIG. 4 a vertical sectional representation of the component illustrated in FIG. 3, FIG. 5 a top view of a similar component having an acutely-tapering light waveguide as the third embodiment, FIG. 6 the third embodiment illustrated in FIG. 5 in vertical section, FIG. 7 the component illustrated in FIGS. 5 and 6 in a vertical section perpendicular to the section plane according to FIG. 6, and FIG. 8 the same component in a perspective view toward the waveguide.

DESCRIPTION OF THE EMBODIMENTS

Figure 1:
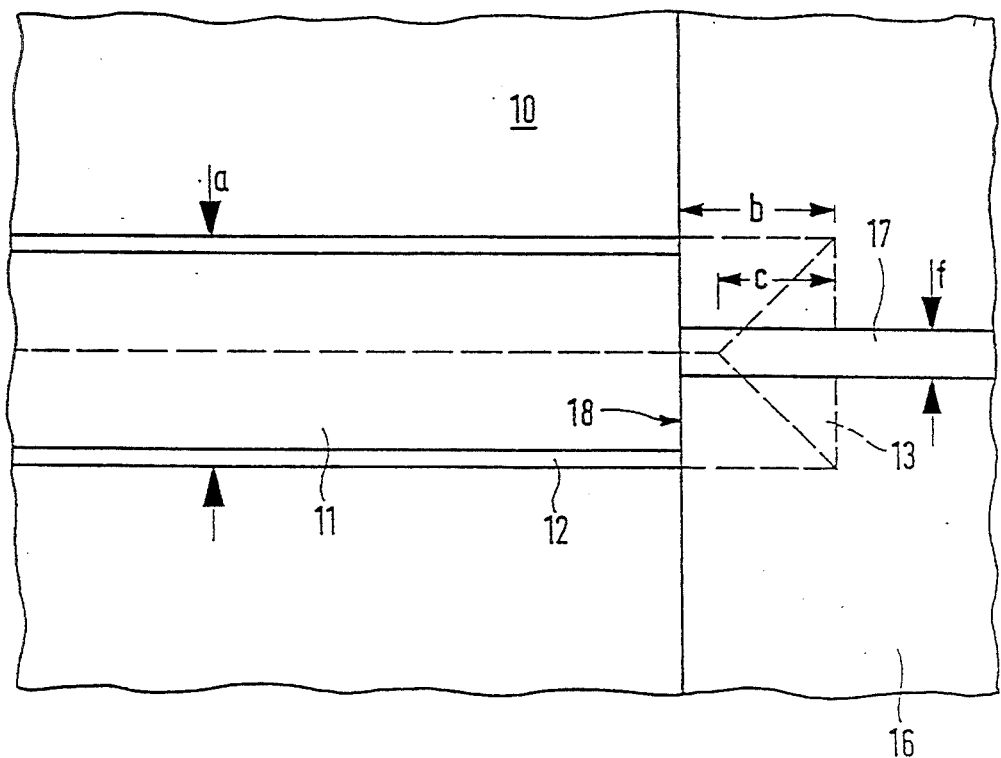
Figure 2:
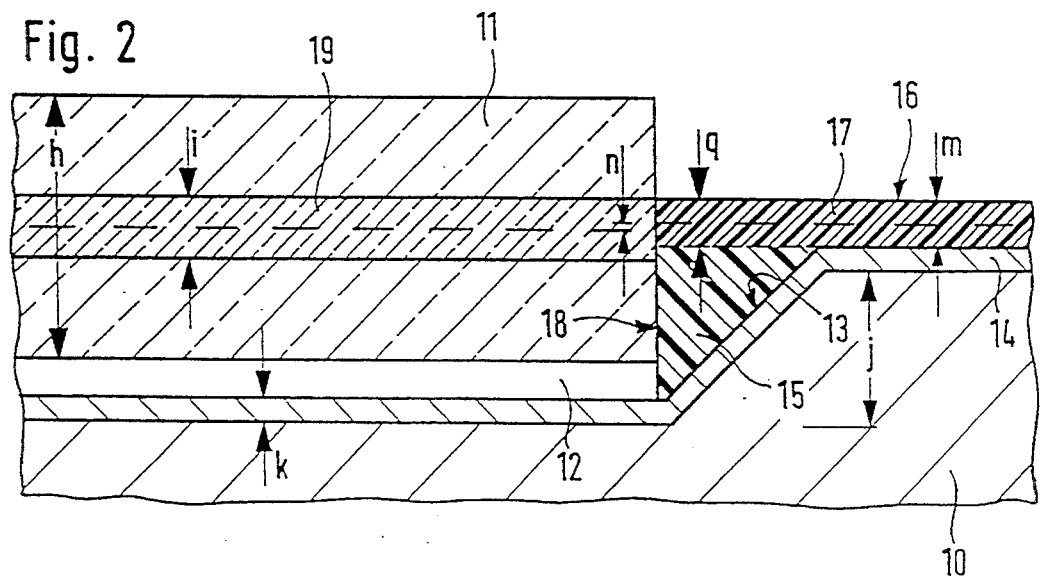

The integrated optical component illustrated in FIGS. 1 and 2 essentially comprises a silicon substrate 10, into which a positioning trench 12 that has a V-shaped cross-section is anisotropically etched in order to receive a glass fiber 11. The known anisotropic etching technique has an advanced stage of development, and is also used in the prior art mentioned at the outset. The width a of the positioning trench 12 and thus the depth j of the etched groove are determined with the aid of the window opening in an etching mask. With the aid of alkaline etching media, e.g. potassium hydroxide, V-shaped depressions result, which form a very precise angle of 54.7° with the surface. Such an angle also forms on a diagonal end surface 13 of the positioning trench 12, which extends into the trench over a length c.

Following etching of the pre-processed silicon substrate 10 (wafer), which can also support active and/or passive optical components, not shown, and electronic arrangements, an optical buffer layer 14 that has a low refraction index and a thickness k is applied. It can be made of silicon oxide, but an organic film can also be used. The buffer layer thickness must be considered a mask guide during the etching of the positioning trench 12.

Afterward an optical polymer such as PMMA with a photoinitiator is applied to the entire surface; in the region of the positioning trench 12, this polymer leads to a filling 15 of this trench and, in the other region, leads to the formation of a layer 16 that coats the surface.

Now a light waveguide 17 having a width f is created in the layer 16 by means of UV exposure. A local photopolymerization leads to a refraction index increase in the exposed area. The exposure mask, not shown, is aligned so as to fit exactly with the etched V-grooves of the positioning trench 12, or aligned with additional adjusting aids. The light waveguide 17 then forms corresponding to the shape of the longitudinally-extending mask opening.

Instead of the described photopolymerization, the light waveguide 17 can also be effected equivalently by means of a local thermal polarization and/or a UV photobleaching process.

Lateral light guidance is realized by means of a typically small index difference between the exposed (light waveguide 17) and unexposed region (weak guidance). In the case of thin layers (approximately 2 μm), the vertical expansion of the light waveguide 17 is determined by the thickness m of the polymer layer 16, and the vertical wave guidance due to the index jump is determined on the one side to the buffer layer (14) and on the other side to air or, as the case may be, an upper cover layer (strong guidance). With small layer thicknesses, the corresponding field distributions can generally be adapted well to the field distributions of active optical semiconductor elements on the integrated-optical chip.

In the region of greater layer thicknesses, that is, in the region of the filling 15, the vertical expansion of the light waveguide 17 is limited by the effective depth of the photopolymerization process. With strong UV absorption of the materials that can be photopolymerized, this depth is a function of exposure parameters and the material composition (e.g. proportion of the photoinitiator), so that here the channel waveguide can be purposefully expanded to an adjustable depth q beneath the surface. At the same time, the light wave is likewise weakly guided downwardly in these regions, as is the case in the lateral direction, facilitating the field adaptation to the radially-symmetrical distribution of the fiber.

Up to this production step, the positioning trench 12 is filled with the optical polymer. For the chip-fiber coupling, the positioning trench 12 must now be exposed in order to receive the glass fiber 11 with the diameter h. This can be effected by means of laser ablation with an excimer laser. The resulting, sufficiently smooth edge of cut 18 renders further machining of the light guide end surface unnecessary. The cut is effected at a distance b from the upper end edge of the positioning trench 12; this distance b exceeds the expansion c of the diagonal end surface, and thus permits an end-to-end coupling between glass fiber 11 and light waveguide 17 that is only limited by the remaining roughness of the light guide end surface. The relative vertical position n of the optical axes of light waveguide 17 and glass fiber 11 can be optimized overall over the depth of the V-groove such that the optical fields overlap as well as possible. The glass fiber core 19 having the diameter i is then aligned sufficiently exactly with the light waveguide 17. In the case of a strongly-guiding upper cover layer, e.g. air, the glass fiber 11 can also be positioned slightly lower, so that the glass fiber core 19 ends flush with the light waveguide 17 at the top, as shown in FIG. 2.

In the case that the buffer layer 14 is an organic buffer layer, it is likewise removed by means of laser ablation, which is to be considered in the mask layout over the width of the structures to be etched.

In the described production method, all degrees of freedom of the chip-fiber coupling are determined with sufficient precision by the mask process with only one lithography/etching step for the positioning trench 12 and one UV exposure for the light waveguide 17. A thermal basking process for stabilizing the photopolymerized wave guide structures can still then be effected before the end surfaces are created by the laser treatment and the positioning trench 12 is exposed. The fiber can then be inserted directly into the positioning trench 12 without active adjustment and fixed. It is noted here that, for simplification, only a single positioning trench 12 having a glass fiber 11 and a light waveguide 17 is illustrated in FIGS. 1 and 2 and also in the other figures to be described. In practice, however, a number of parallel positioning trenches 12 are created, and a corresponding number of light waveguides 17 are produced by means of exposure before a corresponding number of glass fibers 11 are in turn inserted and fixed.

To increase the thermal and mechanical stability, a common upper cover layer that is not shown in the figures can be created by means of common casting of the inserted glass fibers 11 and the light waveguides 17. For example, a UV-hardenable, optical liquid polymer can be used for this purpose. If the index jump to this upper cover layer is kept small, a further approach of the field distributions can be undertaken by means of a vertically weak guidance.

Of course, it is also possible to use a different plastic material for the filling 15, one which has a low optical vaporization and suitable refraction indices, for the layer 16 and the light waveguide 17, provided that special emphasis is placed on a strong guidance in the light waveguide 17 in the connection region to the glass fiber 11.

Figure 3:
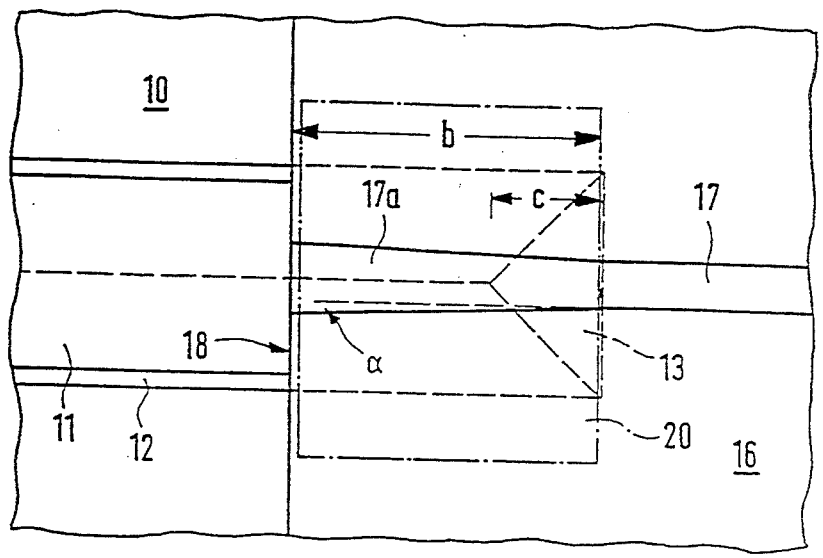
Figure 4:
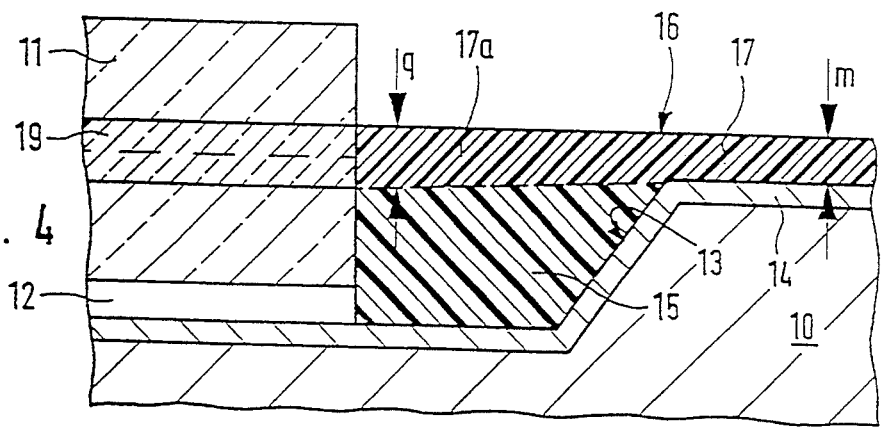
Figure 5:
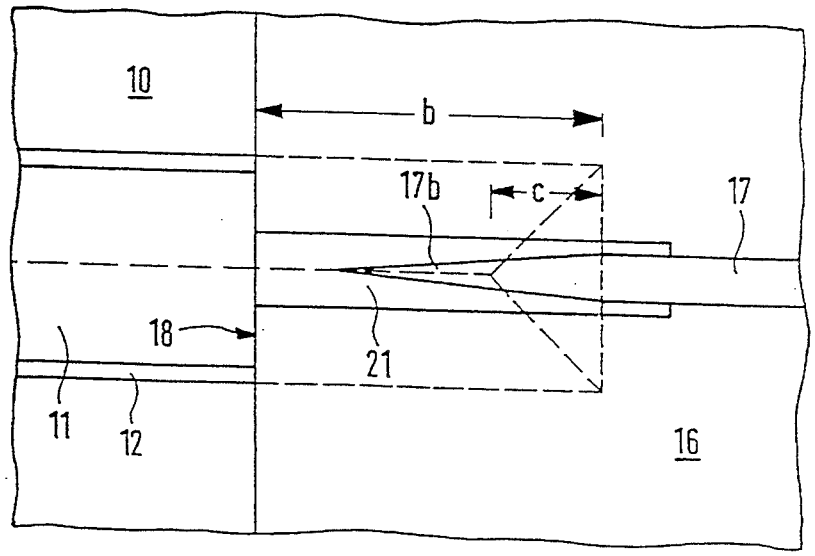

In the second embodiment, which is illustrated in FIGS. 3 and 4, identical or identically-functioning parts and regions are provided with the same reference numerals, and are not described again.

A tapered structure is used here to optimize the field adaptation between the glass fiber 11 and the light waveguide 17. The end region 17a of the light waveguide 17 on the side of the glass fiber is adiabatically expanded to the diameter of the glass fiber core 19. This takes place laterally by means of a corresponding widening of the mask opening of the exposure mask, whose longitudinal edges have a small opening angle α. In a typical example, $\alpha \leq 1°$, and the taper length is approximately 500 μm. With a light waveguide width of 4 μm and a fiber core diameter of approximately 10 μm.

The vertical expansion of the end region 17a of the light waveguide 17 is a function of the material composition and the exposure. For example, with a PMMA material that has a photoinitiator, the maximum index increase achievable by means of UV exposure is a function of the concentration of the photoinitiator. In vertical tapering this saturation effect can be utilized such that, with strong overexposure of the light waveguide, on the one hand its refraction index remains constant at the saturation value, while on the other hand the depth expansion increases with the exposure dose (intensity·time). Because of this, the end region 17a can be vertically widened to the filling 15, as shown in FIG. 4. The increasing widening toward the glass fiber core can be effected with a so-called neutral wedge filter that has a high transparency on the side of the fiber and a lesser transparency on the side of the waveguide. This widening to a width q with respect to the thickness m of the layer 16 can, of course, also be effected in the first embodiment, in which the lateral width remains constant.

By means of a UV postexposure of the layer 16 in the region of the tapered structure, the refraction index outside of the light waveguide 17 can be additionally increased, so that the light guidance becomes weaker with a decreasing refraction index difference, and the field adaptation toward the glass fiber 11 can be further optimized. This postexposure can also create an adiabatic index course when a mask that has variable transparency is again used ("neutral wedge filter"). In FIG.

3 the region 20 to be subjected to postexposure is characterized by a border. The exposure for fiber arrays disposed parallel can be effected in strips across all positioning trenches 12 by means of simple mask adjustment.

In the third embodiment illustrated in FIGS. 5 through 8, the end region 17b of the light waveguide 17 on the side of the glass fiber converges acutely and terminates in front of the edge of cut 18. This end region 17b is surrounded by a further light waveguide 21, which produces the connection to the glass fiber 11 or the glass fiber core 19. By means of this, very thin light waveguides 17 can also be optimally coupled to a relatively thicker glass fiber core 19. The further light waveguide 21, which has a slightly lower refraction index in comparison to the light waveguide 17, is created by a second exposure process with its own exposure mask. With a larger cross-section, and with a suitable index profile that has a correspondingly larger depth expansion of the optical fields in the region of the filling 15, the field distribution of the glass fiber 11 (typical glass fiber core diameter i approximately 8–10 μm) can then be approached to achieve high coupling efficiency. By means of the acutely converging shape of the end region 17b, the light wave guided therein is overcoupled into the further light waveguide 21 with a low refraction index. The field distribution in the very narrow light waveguide 17 is, for example, adapted to optoelectronic semiconductor components, and an adaptation to the field distribution of the glass fiber 11 is then accomplished by means of the light waveguide 21.

Another upper cover layer 22, which covers the layer 16 or the light waveguide 17 and can also cover the glass fiber 11, is illustrated in FIGS. 7 and 8. FIG. 7 shows a cross-section through the arrangement perpendicular to the longitudinal direction of the light waveguide outside of the positioning trench 12.

In the perspective view according to FIG. 8, to simplify the representation, the buffer layer 14 was omitted. A representation of the glass fiber 11 and the cover layer 22 was also omitted.

Instead of the described structuring technique (UV irradiation) for creating the light waveguide, in principle other structuring techniques can be used, such as an ion implantation or the creation of a rippled waveguide, e.g. through dry etching. With such structuring techniques, including the described UV irradiation or the UV photobleaching process, in addition to the production of the light waveguide, other conducting structures, switches or the like can be produced on the integrated-optical chip in uniform technology.

Depending on the coupling efficiency requirement between fiber and waveguide, the described measures can be performed in a more or less distinctive manner. If the requirements are not so high, the simpler embodiment according to FIG. 1 can suffice, for example.

I claim:

1. Integrated optical component, particularly modulator, directional coupler, switch, polarizer, distributor or the like, having a light waveguide of an optical polymer and disposed on a silicon substrate that has at least one optical buffer layer having a low refraction index, further having a positioning trench that is anisotropically etched into the substrate, is essentially aligned with the light waveguide and has a V-shaped cross-section for receiving a glass fiber to be coupled to the coupling end surface of the light waveguide by means of end-to-end coupling, characterized in that the positioning trench (12) is filled with a plastic material (15) at the coupling-side end region, wherein the light waveguide (17) extends on the plastic material (15) up to an end surface (18) of the plastic material (15) which extends perpendicular to the axial direction of the light waveguide (17) and lies in the plane of the coupling end surface, and that this end surface (18) is disposed outside of a diagonally-extending end region (13) of the positioning trench (12).

2. Component according to claim 1, characterized in that a layer (16) which covers the buffer layer (14) that supports the light waveguide (17) and the plastic material (15) up to the plane of the end surface (18) is provided from an optical polymer that can be altered in its refraction index by means of exposure, wherein the light waveguide (17) is configured as a part of this layer (16) by means of corresponding exposure of the same.

3. Component according to claim 2, characterized in that the region of the layer (16) that is configured as a light waveguide (17) has a higher refraction index.

4. Component according to claim 1 characterized in that the positioning trench (12) has a dimensioning by means of which the glass fiber core (19) of the inserted glass fiber (11) is aligned with the light waveguide (17).

5. Component according to claim 2, characterized in that the plastic material (15) for filling the positioning trench (12) is an optical polymer.

6. Component according to claim 5, characterized in that the plastic material (15) is identical to the optical polymer of the layer (16) covering the buffer layer (14).

7. Component according to claim 2, characterized in that the end region (17a) of the light waveguide (17) on the side of the glass fiber is adiabatically widened to the diameter of the glass fiber core (19).

8. Component according to claim 7, characterized in that a lateral and/or vertical widening is provided.

9. Component according to claim 2, characterized in that the end region (17b) of the light waveguide (17) on the side of the glass fiber converges acutely and terminates in a further light waveguide (21) that has a lower refraction index and extends up to the glass fiber core (19).

10. Component according to claim 9, characterized in that the further light waveguide (21) has a greater expansion in width and/or in depth, and the dimensioning of the glass fiber core (19) is adapted to the coupling end surface.

11. Component according to claim 2, characterized in that, for field adaptation of the light waveguide (17) toward the glass fiber (11), the region of the optical polymer layer (16) surrounding the light waveguide (17) has an adiabatic index curve which reduces the refraction index difference between light waveguide (17) and this surrounding region toward the glass fiber.

12. Method of producing an integrated optical component, such as a modulator, directional coupler, switch, polarizer, distributor or the like, having a light waveguide of an optical polymer which is disposed on a silicon substrate that has at least one optical buffer layer having a low refraction index, wherein a positioning trench for receiving a glass fiber to be coupled to the coupling end surface of the light waveguide, which trench has a V-shaped cross-section and is essentially aligned with the light waveguide, is anisotropically etched into the substrate by means of an exposure mask having a longitudinally-extending mask opening, characterized in that, following the etching of the positioning trench (12), a) the optical buffer layer (14) is applied,
b) a layer (16) of an optical polymer is applied on top of this layer, wherein the positioning trench (12) is filled with a plastic material (15) prior to or at the same time as this,
c) the light waveguide (17) is formed by means of corresponding local exposure or thermal polarization of this layer (16), and
d) the positioning trench (12) is exposed up to a plane (18) that extends perpendicular to the axial direction of the light waveguide (17) and forms a coupling end surface.

13. Method according to claim 12, characterized in that the application of the layer (16) and the filling of the positioning trench (12) is executed in one work cycle with the same optical polymer.

14. Method according to claim 12, characterized in that an exposure mask is placed onto the polymer layer (16) and a refraction index increase is effected by means of photopolymerization in a region that is supposed to serve as the light waveguide (17).

15. Method according to claim 12, characterized in that an exposure mask is placed onto the polymer layer (16), and a refraction index reduction of regions that border on the light waveguide (17) is effected by means of a UV photobleaching process.

16. Method according to claim 14, characterized in that an adiabatic widening of the light waveguide (17) before the glass fiber core (19) is executed in order to optimize the field adaptation between glass fiber (11) and light waveguide (17).

17. Method according to claim 16, characterized in that an exposure mask that has a widening mask opening is used for lateral widening up to the diameter of the glass fiber core (19).

18. Method according to claim 16, characterized in that the exposure intensity and/or the exposure time toward the glass fiber is/are increased in the manner of a ramp for vertical widening up to the diameter of the glass fiber core (19).

19. Method according to claim 14, characterized in that a first light waveguide (17) extending acutely toward the glass fiber (11) is formed in a first exposure step with a first exposure mask, and that a second light waveguide (21) which has a lower refraction index and connects the first light waveguide (17) with the coupling end surface is formed in a second exposure step with a second exposure mask, wherein the second light waveguide (21) is adapted in its diameter to the glass fiber core.

20. Method according to claim 16, characterized in that an exposure mask that has variable transparency, with a greater transparency on the fiber side and a lesser transparency on the light waveguide side, is used for a postexposure of the layer (16).

21. Method according to claim 12, characterized in that the exposure of the positioning trench (12) is effected by means of a laser (laser ablation).

22. Method according to claim 12, characterized in that a number of contiguous connections, positioning trenches (12) and light waveguides (17) are produced simultaneously.

* * * * *

UNITED STATES PATENT AND TRADEMARK OFFICE
CERTIFICATE OF CORRECTION

PATENT NO. : 5,444,805
DATED : August 22, 1995
INVENTOR(S) : Klaus-Michael Mayer It is certified that error appears in the above-indentified patent and that said Letters Patent is hereby corrected as shown below:

On the title page: Item [22] should read as follows:

[22] Filed  February 6, 1993

Items [86] and [87] should be inserted to read as follows:

[86] PCT NO:   PCT/DE93/00103
    371 DATE: September 2, 1994
    102(e) Date: September 2, 1994

[87] PCT Pub. No:  WO93/18422
    PCT Pub. Date: September 16, 1993

Signed and Sealed this

Thirtieth Day of January, 1996

Attest:

BRUCE LEHMAN

Attesting Officer  Commissioner of Patents and Trademarks